O. B. PARKER.
Fruit-Gatherer.

No. 40,638.

Patented Nov. 17, 1863

Witnesses:
Frederick Curtis
F. P. Hale Jr.

Inventor:
O. B. Parker

UNITED STATES PATENT OFFICE.

OWEN B. PARKER, OF HOPKINTON, MASSACHUSETTS.

IMPROVEMENT IN FRUIT-GATHERERS.

Specification forming part of Letters Patent No. 40,638, dated November 17, 1863.

*To all whom it may concern:*

Be it known that I, OWEN B. PARKER, a resident of Hopkinton, in the county of Middlesex and State of Massachusetts, have invented an Improved Fruit Basket, Vessel, Pail, or Gatherer; and I do hereby declare the same to be fully described in the following specification and represented in the accompanying drawings, of which—

Figure 1:
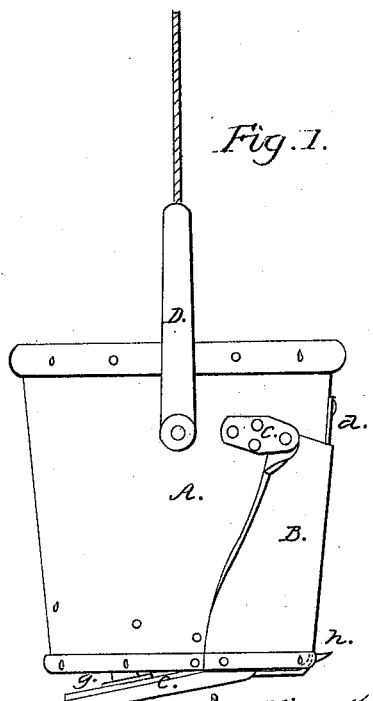
Figure 2:
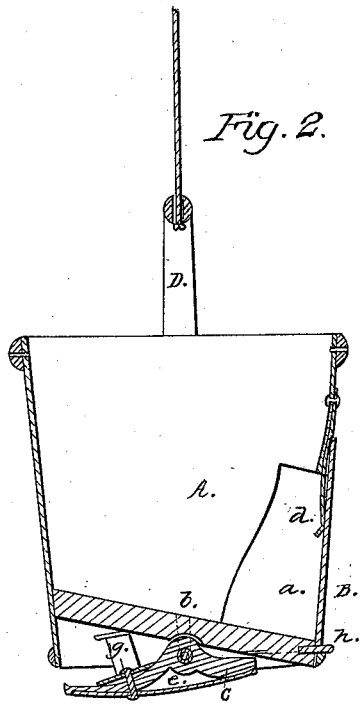
Figure 3:
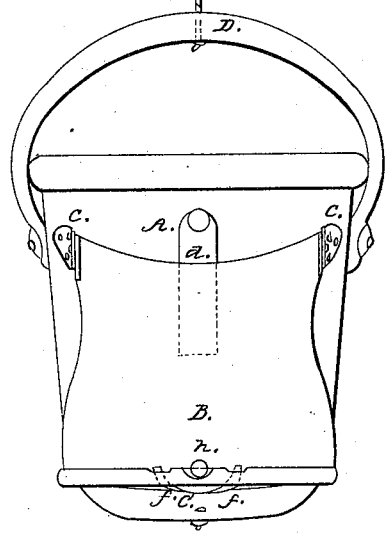
Figure 4:
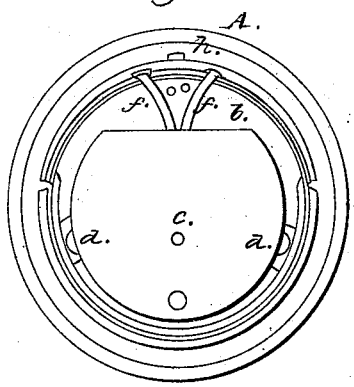

Figure 1 denotes a side elevation, Fig. 2 a vertical section, Fig. 3 a front elevation, and Fig. 4 a bottom view, of it.

In using my invention it is intended to be hung or supported within a tree while a person may be in the act of picking fruit therefrom, he, as fast as he may, gathering the fruit, putting it into the basket, which, after having been either wholly or partially filled, is to be lowered by him to the ground or a barrel or receptacle under the tree. On the trigger of the bottom of the fruit-basket coming into contact with the ground or the said barrel or fruit within the latter, such trigger will be so moved as to set free the hinged flap or door of the basket, which will spring or be pushed open, so as to enable the fruit to fall out of the opening in the side of the basket and be discharged therefrom, which, having taken place, the basket may be drawn up into the tree to be again supplied with fruit.

The purpose of my invention is to save the bruising of the fruit which usually results to it when allowed to fall from the tree to the ground.

In carrying out my invention, the body A of it may be constructed of basket-work or otherwise, and should be provided with an opening, $a$, through its side and just above the bottom $b$, the said bottom having a pitch or inclination toward the said opening, as shown in Fig. 2. To the said opening there is applied a flap or door, B, by means of hinges $c\ c$, such door and the body A being furnished or not, as circumstances may require, with a spring, $d$, for aiding in opening the door. To the said bottom $b$, or underneath the same, there is trigger or lever-catch, C, which plays on a fulcrum, $e$, and has prongs $f\ f$, to catch upon or over the lower edge of the flap or door in such manner as to hold the door closed, and this by the action of a spring, $g$, arranged between the said trigger and the said bottom of the pail or basket. If desirable, there may be applied to the said bottom a twin button, $h$, or other suitable fastening for the purpose of securely closing the door independently of the prongs of the trigger. The basket or pail may have a handle, D, and be open at top, the said handle being provided with a suspension-rope.

I claim—

The said fruit basket or gatherer, as constructed, not only with the opening in its side and with a flap or door thereto, but with a trigger or lever-catch applied to the bottom, the whole being as and to operate substantially as described.

OWEN B. PARKER.

Witnesses:
R. H. EDDY,
F. P. HALE, Jr.